July 24, 1962    W. J. EAST    3,046,482
ELECTRONIC CIRCUIT TESTER
Filed Sept. 29, 1959
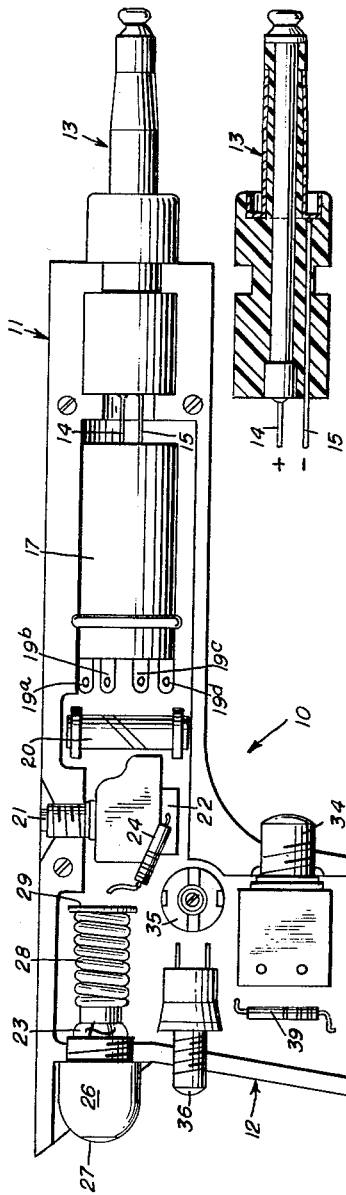
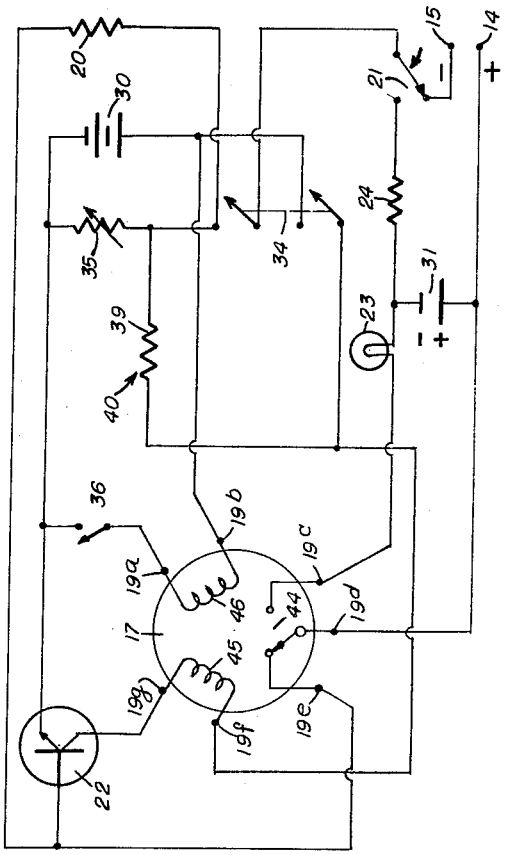
INVENTOR
WILLIAM J. EAST
BY

United States Patent Office 3,046,482
Patented July 24, 1962

3,046,482
ELECTRONIC CIRCUIT TESTER
William J. East, Washington, D.C., assignor to the United States of America as represented by the Secretary of the Army
Filed Sept. 29, 1959, Ser. No. 843,315
2 Claims. (Cl. 324—72.5)
(Granted under Title 35, U.S. Code (1952), sec. 266)

The invention described herein may be manufactured and used by or for the Government for governmental purposes without the payment to me of any royalty thereon.

This invention relates generally to improved means for indicating the presence of voltage in a socket, plug or jack which would be of sufficient magnitude to cause premature detonation of an explosive cartridge which is to be connected therein.

Explosive cartridges, such as squibs, are used in ordnance devices for the purpose of initiating explosive operations such as the detonation of a missile. Sometimes, however, premature explosion occurs because the plug, socket or jack into which the explosive cartridges are to be connected has accidentally obtained sufficient energy to cause explosion of the explosive cartridge as soon as it is connected. These premature explosions can produce disastrous results such as where missiles and rockets are being connected to a plane prior to take-off. It is of considerable importance therefore to be able to conveniently determine when the explosive cartridge can be safely placed in its socket. This invention provides improved means for making this determination.

According to this invention an electronic circuit tester is provided which can be operated with one hand and which, with a high degree of sensitivity, indicates the presence of some predetermined minimum voltage at a socket, plug or jack. Means are also provided to reset the tester and to check out the various components in the tester for voltage sensitivity and proper functioning.

Broadly therefore, it is an object of this invention to provide an electronic circuit tester which will detect the presence of some predetermined minimum voltage at sockets, plugs or jacks, which voltage would be sufficient to cause premature ignition of an explosive charge which is to be connected therein.

More specifically, it is an object of this invention to provide an electronic circuit tester which will detect the presence of some predetermined minimum potential at a socket and indicate by the lighting of a bulb the presence of such a predetermined minimum potential.

An additional object of this invention is to provide a circuit tester in accordance with the foregoing objects and which can instantly check the lighting capability of a bulb which is used to determine the presence of a predetermined minimum voltage.

Still another object is to provide a circuit tester having the above features which can be operated with one hand and which is reliable, sturdy and relatively inexpensive to manufacture.

The specific nature of the invention, as well as other objects, uses and advantages thereof, will clearly appear from the following description and from the accompanying drawing, in which:

FIG. 1 is a sectional side view of the electronic circuit tester in accordance with this invention.

FIG. 1a is a sectional side view of the probe which is used in the electronic circuit tester of this invention.

FIG. 2 is a wiring diagram of the circuit tester shown in FIG. 1.

FIG. 1 shows the positions occupied by the various components which comprise the electronic circuit tester 10 of this invention. The pistol shape of tester 10 permits it to be operated and manipulated by one hand of the operator. The body of the tester 10 is composed of a clear plastic such as Lexan, and consists of a barrel 11 and a handle 12 which extends from the receiver end of barrel 11. Probe 13 which is shown in detail in FIG. 1a extends from the muzzle end of barrel 11 and is designed to be inserted into the particular socket, plug or jack which it is to be tested for the presence of electrical energy. Lead wires 14 and 15 extend from probe 13 and are connected to relay 17.

Relay 17 is of conventional type and has seven contacts 19a, 19b, 19c, 19d, 19e, 19f, and 19g extending from the end thereof. Resistance unit 20 is positioned adjacent the ends of these contacts and has a resistance value which is the same as the resistance value of the squib (not shown) which is to be inserted into the socket, plug or jack. Test switch 21 is positioned between resistance unit 20 and bulb 23. Bulb 23 is mounted in the receiver end of barrel 11 and is encased by cap 26. One end of cap 26 is threaded into the receiver end of barrel 11. Coil spring 28 expanding against tab 29 urges bulb 23 into cap 26. Tab 29 is fixed and extends from the inner wall of barrel 11. The end of cap 26 has a circular opening 27 so that the operator can see whether the bulb is on or off.

NPN junction transistor 22 is positioned below test switch 21, while resistor 24 is positioned between tab 29 and switch 21. Dry cell batteries 30 and 31 are inserted into the handle 12 so that the terminals contact U-shaped plate 32 while the lower ends of the batteries rest against plate 33. Positioned above batteries 30 and 31 in handle 12 is a control switch 34, a potentiometer 35 and a reset switch 36. Switches 21, 34 and 36 are conventional microswitches as will be evident to those in the art.

FIG. 1a shows in detail the probe 13 and the lead wires 14 and 15 which extend therefrom. As will be evident to those in the art, probe 13 is of conventional construction. For the purposes of this invention other types of probes may also be used.

FIG. 2 shows the detailed circuitry between the various components which form circuit tester 10. The series connection of battery 30, potentiometer 35, and resistor 39 form a biasing circuit designated by numeral 40 which provides a predetermined voltage level to the collector of transistor 22 through coil 45 of relay 17. This voltage level is lower than the voltage which would cause premature detonation of a squib. The voltage level of biasing circuit 40 can easily be adjusted by adjustment of potentiometer 35. As will be evident to those in the art, biasing circuit 40 greatly increases the voltage sensitivity of circuit tester 10 to voltages at the socket, jack or plug, to which leads 14 and 15 are connected by varying the base voltage of transistor 22, necessary to cause the transistor to conduct.

Relay 17 has a coil 45, in series with biasing circuit 40, which is designed to repel switch 44 from the position shown in FIG. 2 where it connects contact 19d with contact 19e. Transistor 22 is selected so that it will energize coil 45 when the impressed voltage across the transistor would be sufficient to cause premature detonation of a squib. The voltage, if any, at the socket is received by lead wire 14 and unless this voltage combined with the voltage produced by biasing circuit 40 would be sufficient to initiate a squib prematurely, transistor 22 will not energize coil 45.

In testing the socket for the presence of voltage which would be sufficient to cause premature detonation of the squib, probe 13 is inserted into the socket, and control switch 34 in handle 12 is pressed by the operator. When switch 34 is pressed, battery 30 in biasing circuit 40 will energize transistor 22 to a predetermined voltage level. If the socket has a potential which would be sufficient to detonate a squib placed therein, the additional voltage received by transistor 22 from lead wire 14 will cause transistor 22 to energize coil 45 repelling switch 44 in the direction of the arrow (FIG. 2). As a result, electrical connection will occur between contacts 19c and 19d, causing bulb 23 to flash on. The lighting of bulb 23 indicates to the operator the presence of a dangerous potential at the socket. Of course, if there is no potential at the socket or if the potential level would not be sufficient to cause premature detonation of a squib the combination of the voltage received by transistor 22 from lead wire 14 and the voltage from biasing circuit 40 will not be sufficient to cause transistor 22 to energize coil 45.

The circuit tester 10 can be reset by removing the probe 13 from the socket and pressing reset switch 36. When switch 36 is pressed, energy from battery 30 will pass through coil 46 causing switch 44 to move back to the position shown in FIG. 2 where contacts 19d and 19e are again electrically connected.

If bulb 23 fails to light when control switch 34 is pressed by the operator, it may be because there is a defect or failure in one of the components which comprise the circuit tester. In order to ensure that these components would function if there were a voltage at the socket sufficient to detonate the squib, the operability and sensitivity of the tester can be checked out by pressing test switch 21. Pressing switch 21 will cause this switch to move in the direction of the arrow (FIG. 2). Control switch 34 is then pressed so that battery 30 is placed in series with battery 31 and resistance 24. Starting at terminal 14, the test circuit consists of the series connection of the following elements: battery 31, resistor 24, switch 21, the upper terminal of switch 34, potentiometer 35, battery 30, the lower terminal of switch 34, coil 45, and the collector of transistor 22.

Battery 31 and resistance 24 are selected such that a potential is produced by these components which is equal to the minimum predetermined voltage for causing transistor 22 to conduct and energize coil 45. Thus, battery 31 and resistance 24 when placed in series with feedback circuit 40 provide a voltage which is just equal to that which would cause premature detonation of a squib. Bulb 23 will of course be lighted by such a voltage if all the components are operating properly and at a proper sensitivity level. Failure of bulb 23 to light will result from defective components and this fact will be apparent to the operator.

It will be evident to those skilled in the art that by merely changing the resistance value of resistance unit 20, circuit tester 10 will indicate the presence of any predetermined minimum voltage at a socket, plug or jack. Thus circuit tester 10 is capable of being easily converted so that it will determine the presence of any predetermined minimum level of voltage which would be sufficient to detonate any type of squib.

It will be apparent that the embodiments shown are only exemplary and that various modifications can be made in construction and arrangement within the scope of the invention as defined in the appended claims.

I claim as my invention:
1. A circuit tester for indicating the presence of a voltage of a predetermined minimum magnitude at a socket, comprising: a holder having a barrel and a handle extending therefrom such that said holder is pistol-shaped, a probe extending from the muzzle end of said barrel and insertable in said socket for detecting the presence of voltage, a relay in said barrel, said relay being electrically connected to said probe, a bulb electrically connected to said relay, said bulb extending from the end of said barrel opposite said muzzle end, a transistor housed in said barrel and electrically connected to said relay and said probe, biasing circuit means for providing a constant preselected voltage to said transistor, said preselected voltage being less than said voltage of a predetermined minimum magnitude, means including said transistor for energizing said relay upon the occurrence of a voltage at said probe of a magnitude at least equal to the difference between said predetermined and said preselected voltages, and means mounted within said holder for checking the sensitivity of said tester, said means comprising a test switch, a battery in circuit with said test switch and said transistor, the voltage of said battery being equal to the difference between said predetermined and said preselected voltages.

2. A circuit tester for indicating the presence of a voltage of a predetermined minimum magnitude at a socket, comprising: a holder having a barrel and a handle extending therefrom such that said holder is pistol-shaped, a probe extending from the muzzle end of said barrel and insertable in said socket for detecting the presence of voltage, a relay in said barrel, said relay being electrically connected to said probe, a bulb electrically connected to said relay, said bulb extending from the end of said barrel opposite said muzzle end, a transistor housed in said barrel and electrically connected to said relay and said probe, biasing circuit means for providing a constant preselected voltage to said transistor, said preselected voltage being less than said voltage of a predetermined minimum magnitude, means including said transistor for energizing said relay upon the occurrence of a voltage at said probe of a value at least equal to the difference between said predetermined and said preselected voltages, switch means mounted in said handle for connecting said biasing circuit to said transistor and relay means for checking the sensitivity of the tester, said last-named means including a test switch and a battery in circuit with said test switch and said transistor, the potential of said battery being equal to the difference between said predetermined and said preselected voltages, and means for resetting said tester comprising a switch in series with said feedback circuit and said relay.

References Cited in the file of this patent
UNITED STATES PATENTS

| | | |
|---|---|---|
| 2,584,990 | Dimond | Feb. 12, 1952 |
| 2,877,419 | East et al. | Mar. 10, 1959 |
| 2,942,189 | Shea | June 21, 1960 |
| 2,955,237 | Wyndham | Oct. 4, 1960 |